sea water or loss of hydraulic control fluid. The flowlines are encased or carried in conduits which are connected together and disconnected from each other by an external, remotely operable tool. Each retrievable flowline contains the female half of a coupling which is engageable with the male half thereof contained in the nonretrievable flowline. Guide means on the connector halves provide final axial alignment and rotational alignment when the halves are brought together to make the coupling and conduit connections. Also, each coupling half is free to float in a plane perpendicular to the axis of the carrier conduit in which it is located to adjust for axial or angular misalignment. Seal means are also provided to prevent extraneous fluid (water) from entering the control fluid flowlines during connection and disconnection of the two halves of the coupling. Additional seal means are provided to seal the connection once the connection has been made up.

United States Patent [19]
Weber et al.

[11] 3,918,485
[45] Nov. 11, 1975

[54] MULTIPORT SUBSEA CONNECTOR

[75] Inventors: Ronald A. Weber, Ojai; Zane L. Griffin, Port Hueneme, both of Calif.; Thomas W. Childers, Mandeville, La.

[73] Assignee: Exxon Production Research Company, Houston, Tex.

[22] Filed: Sept. 18, 1973

[21] Appl. No.: 398,362

[52] U.S. Cl. ............ 137/594; 285/137 R; 285/340; 277/236; 277/212 R
[51] Int. Cl.² ................... F16L 35/00; F17D 1/00
[58] Field of Search ...... 137/594, 595, 315, 614.04, 137/614.05, 614.06, 614.02, 614.03; 285/137 A, 137 R, 316, 315, 319, 322, 94, 382.7, 340; 251/263, 340; 277/59, 72 FM, 236, 212 C, 212 F, 212 R

[56] References Cited
UNITED STATES PATENTS

| | | | |
|---|---|---|---|
| 2,255,593 | 9/1941 | Berger et al. | 137/614.04 |
| 2,299,193 | 10/1942 | Trautman | 137/614.04 |
| 2,359,648 | 10/1944 | Jones | 137/594 |
| 2,450,170 | 9/1948 | Smith | 285/340 |
| 2,548,528 | 4/1951 | Hansen | 285/316 X |
| 2,628,850 | 2/1953 | Summerville | 285/137 R X |
| 2,757,945 | 8/1956 | Bingham | 285/340 |
| 2,823,934 | 2/1958 | Gorrell et al. | 285/316 X |
| 2,943,871 | 7/1960 | St. Clair | 285/382.7 X |
| 2,966,371 | 12/1960 | Bruning | 137/614.04 X |
| 3,196,897 | 7/1965 | Hodson | 285/316 X |
| 3,305,249 | 2/1967 | Zahuranec | 285/137 R X |
| 3,336,944 | 8/1967 | Anderson et al. | 137/614.04 |
| 3,463,518 | 8/1969 | Boussard et al. | 285/340 |
| 3,628,812 | 12/1971 | Larralde et al. | 285/322 X |
| 3,777,771 | 12/1973 | De Visscher | 137/614.84 X |

*Primary Examiner*—Alan Cohan
*Assistant Examiner*—Robert J. Miller
*Attorney, Agent, or Firm*—John S. Schneider

[57] ABSTRACT

A multiport subsea connector for use in remotely connecting (and disconnecting) nonretrievable, multiple, hydraulic, control fluid flowlines which are part of a submerged, closed, hydraulic power control system to (and from) retrievable, multiple, hydraulic control fluid flowlines attached to a submerged oil and/or gas well tree without ingestion of

24 Claims, 9 Drawing Figures

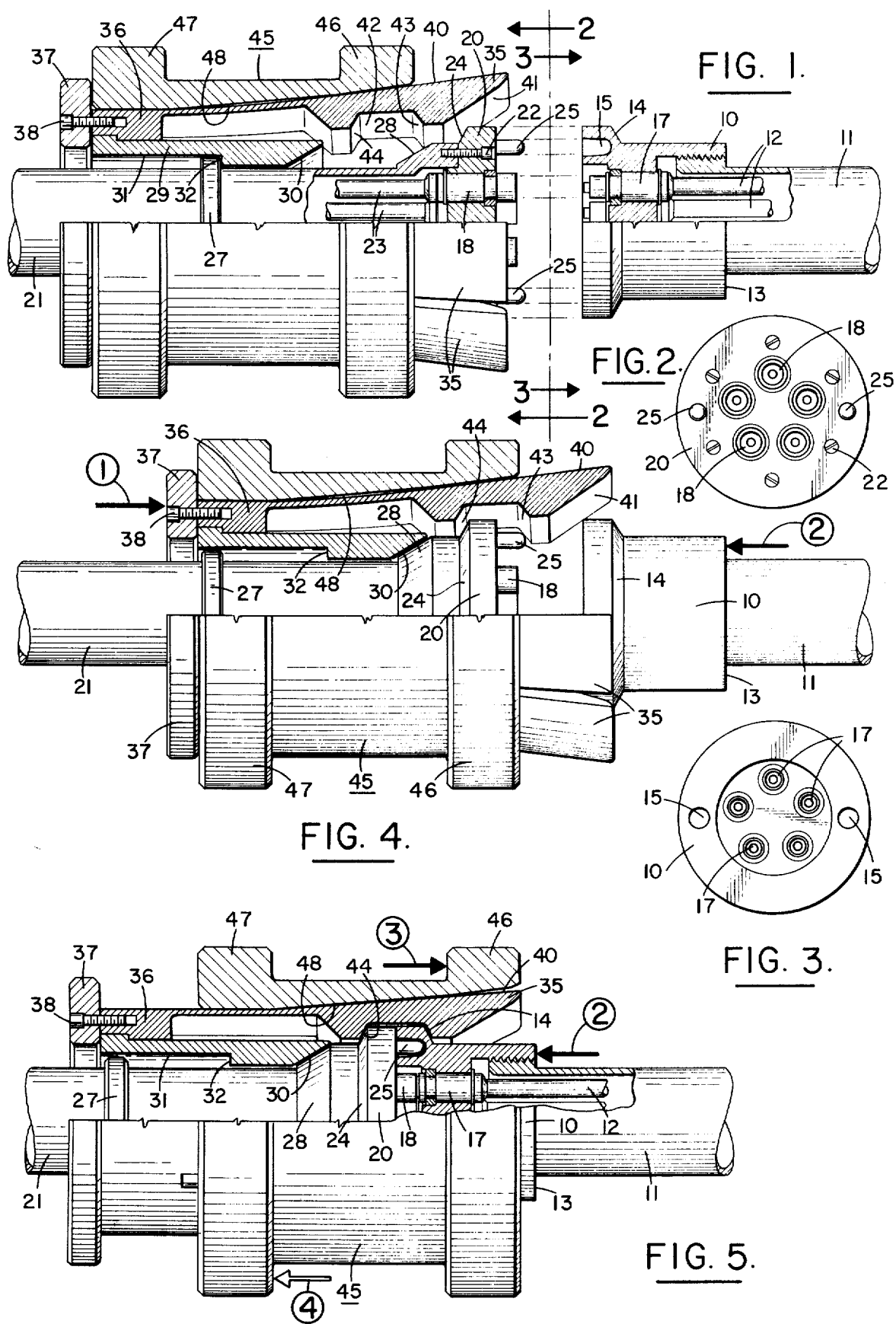

MULTIPORT SUBSEA CONNECTOR

BACKGROUND OF THE INVENTION

1. Field of the Invention

The present invention concerns apparatus for making and breaking subsea pipe or flowline connections and, more particularly, flowline connections for a closed hydraulic power control system in which the flowlines carry control fluid used to control the operation of valves on a submerged oil and/or gas well production system.

2. Description of the Prior Art

In certain types of subsea or submerged production systems used in remotely completing wells and in handling production well fluids in offshore operations, such as, for example, the system disclosed and claimed in U.S. patent application Ser. No. 202,230 filed Nov. 26, 1971 now Pat. No. 3,777,812, entitled "Subsea Production System" by J. A. Burkhardt et al., flowlines carry control fluids to various parts of the system to operate hydraulically operable valves or other functions on the submerged production tree. In the aforementioned Subsea Production System the submerged tree and the flowlines attached thereto are retrievable and connectable to the nonretrievable flowlines of the closed hydraulic power control system. The present invention is an improvement in subsea couplers or connectors and, particularly, in those which are used to connect submerged, multiple, retrievable, tree flowlines to submerged multiple, nonretrievable flowlines of a closed hydraulic system. The coupler of the invention is specifically designed for subsea operations and for connecting into and disconnecting from closed, hydraulic, control fluid systems. This coupler is made up and broken out underwater and under pressure without spilling hydraulic control fluid and without ingestion of extraneous sea water into the control system and has other desirable features which aid in connecting the coupler halves together using remotely operated external tools. Alignment means on each coupler half brings the halves into axial and radial orientation for proper connection. Further, metal-to-metal seals seal off the coupler when the coupler halves are fully connected. Such durable type seals are especially desirable in remote subsea locations.

SUMMARY OF THE INVENTION

In accordance with the teachings of the invention a multiplicity of couplings for use in connecting hydraulic subsea flowlines are arranged in the ends of the flowlines to be connected together. The flowlines are positioned within conduits and one half of each coupling is located in a flange which forms the end of each of the conduits. Means are provided for bringing the conduits towards each other and locking them together using an external, remotely operable tool. Valve means in each coupling half closes the end of the flowline when the coupling halves are disconnected from each other. When the coupling halves are joined to make the connection between the flowlines the valve means open to permit flow of fluids through the flowlines. Guide means are provided on the flanges to aid in making final axial alignment and rotational alignment when the coupling halves are brought together to make the connection. Each coupler half is arranged in the flange with which it is associated in a manner, and is provided with means to permit it to float in a plane perpendicular to the axis of the conduits, to adjust for axial or angular misalignment of the connector or couplings. Seal means associated with the coupling halves cooperate to prevent extraneous fluid from entering the flowlines during connection and disconnection of the coupling. Other seal means formed on the coupling halves seal the coupling connection once the coupling halves have been made up.

BRIEF DESCRIPTION OF THE DRAWINGS

FIG. 1 is a view of the hydraulic connector of the invention in its disconnected position;

FIG. 2 is a view taken along lines 2—2 of FIG. 1;

FIG. 3 is a view taken along lines 3—3 of FIG. 1;

FIG. 4 is a view of the hydraulic connector of FIG. 1 being made up;

FIG. 5 is a view of the hydraulic connector of FIG. 1 after make up;

DESCRIPTION OF THE PREFERRED EMBODIMENT

Figure 6:
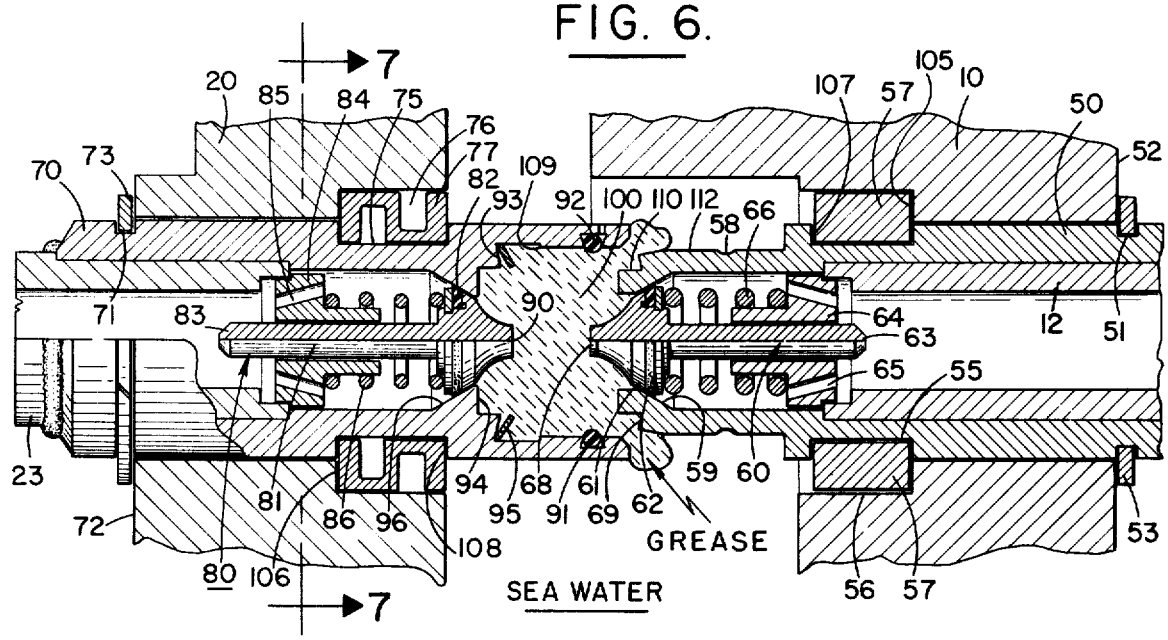
FIG. 6 is a view of one of the hydraulic couplings of the hydraulic connector of FIG. 1 being made up.

Referring to FIGS. 1 to 5 there is shown a hub or connector flange 10 threadedly connected to a carrier conduit 11 in which are located multiple (five) flowlines, each designated by the numeral 12. Flange 10 and conduit 11 form a shoulder 13 at the connection thereof. Flange 10 is provided with a tapered shouldered locking surface 14. Two guide recesses 15 are formed in the face of flange 10. One half, the male half, 17 of each multiple (five) hydraulic couplings is positioned in a hole formed within flange 10 and connects to one of the flowlines 12 at one end thereof and extends to the face of flange 10 at the other end thereof.

Another hub or connector flange 20 is connected to a carrier conduit 21 by means of threaded bolts 22. Five additional flowlines 23, each to be connected to one of the flowlines 12 (see FIG. 5) are located in conduit 21. Flange 20 is provided with a tapered, shouldered locking surface 24. The face of flange 20 contains two guide pins 25, shown 90° out of phase in FIG. 1, which engage with the corresponding guide recesses 15 formed in the face of flange 10. The other half, the female half, 18 of each of the five hydraulic couplings is positioned in a hole formed within flange 20 and connects to one of the flowline 23 at one end thereof and extends to beyond the face of flange 20 at the other end thereof. A stop-ring 27 is affixed to conduit 21 and the end of conduit 21 is formed with a tapered shouldered stop surface 28. A movable cylindrical sleeve 29 is arranged about conduit 21 and is tapered on one end 30 to substantially the same degree as the taper of surface 28. The inner surface of sleeve 29 is recessed as at 31 to provide a stop-shoulder 32 which is engageable with stop-ring 27. A plurality of spring expandable, locking fingers 35 extend from an annular collar portion 36 thereof which is secured to sleeve 29 and bolted to a ring member 37 by bolts 38. Ring member 37 extends outwardly beyond the outer periphery of collar portion 36. Fingers 35 are formed with externally tapered surfaces 40 and internally conically shaped end surfaces 41. A recess 42 formed on the inner surface of each locking finger has tapered walls 43 and 44 for mating engagement with locking surface 14 on flange 10 and locking surface 24 on flange 20, respectively. A movable cylindrical housing 45 having spaced apart collars 46 and 47 and an inner tapered surface 48 surround locking fingers 35. In the retracted position of housing 45, collar 47 abuts ring member 37.

In FIGS. 6 to 9 one of the hydraulic couplings is shown in greater detail. A male sleeve member 50 is threadedly connected or welded directly to flowline 12 and is provided on its outer surface with an annular recess 51 adjacent a shoulder 52 of flange 10. A snap-ring 53 is arranged in recess 51 and engages shoulder 52. Sleeve 50 is provided with another annular recess 55 on its outer surface which together with a recess 56 on the inner surface of flange 10 forms an enlarged annular recess in which is positioned a split-ring keeper 57. The outer surface of sleeve 50 is also provided with an annular groove 58. On its forward end sleeve 50 is provided with a tapered shouldered seating surface 69. The forward inner surface 59 of sleeve 50 is tapered to provide a valve seat for a poppet valve, generally designated 60, contained within sleeve 50 and secured to flowline 12. Poppet valve 60 includes a valve member 61 which contains a ring seal member 62 and is connected to one end of a valve stem 63. The other end of valve stem 63 extends through an opening in a plate member 64 which is provided with flow passageways 65 and is secured to flowline 12. A spring 66 is retained between valve member 61 and plate member 65 and urges ring seal 62 into engagement with valve seat surface 59. Valve member 65 is generally conical in shape and tapers to a pointed end 68 which extends slightly beyond the free end of sleeve 50 when the valve is in fully closed position.

A female sleeve member 70 is threadedly connected to flowline 23 and is provided on its outer surface with an annular recess 71 adjacent a shoulder 72 on flange 20. A snap-ring 73 is arranged in recess 71 and engages shoulder 72. Sleeve 70 is provided with another annular recess 75 on its outer surface which together with an annular recess 76 on the inner surface of flange 20 forms an enlarged recess in which a deformable split-ring keeper 77 is positioned. The inner surface of the forward end of sleeve 70 is provided with a recess 91 in which is arranged an O-ring 92. A tapered shoulder 93 and shoulder 94 formed on the inner surface of sleeve 70 reduce the inner diameter sleeve 70. A metal gasket 95 is positioned adjacent shoulder 93. The forward inner surface of the reduced diameter portion is tapered to provide a valve seat surface 96 for a poppet valve, generally designated 80, contained within sleeve 70 and secured to flowline 23. Poppet valve 80 includes a valve member 81 which contains a ring seal member 82 and is connected to one end of a valve stem 83. The other end of valve stem 83 extends through an opening in a plate member 84 which is provided with flow passageways 85 and is secured to flowline 23. A spring 86 is retained between valve member 81 and plate member 85 and urges ring seal 82 into engagement with valve seat surface 96. Valve member 81 is generally conical in shape and tapers to a pointed end 90 which extends slightly forward of shoulder 93 when valve 80 is fully closed. When in proper operating position as the connectors and couplings are being made up each end 90 of each valve member 81 is aligned with each end 68 of each valve member 61. The space 100 formed by the cup-shaped forward end of sleeve 70 is filled with grease prior to make up of the hydraulic couplings as illustrated in FIG. 6. The wall forming space 100 defines a slight shoulder 109 which acts as a retainer means to keep the metal gasket in the female portion of the coupling when the couplings are disengaged. Deformable keeper ring 77 ensures proper coupler make up. Tolerances are such that the keeper will deform when sufficient load has been applied to the coupler to deform the seal gasket 95 and preload the coupler to exceed internal pressure load plus gasket load. These loads, for example, may total approximately 4,500 pounds. The keeper ring begins yielding at approximately 5,800 pounds and has a flat yield load curve over approximately 0.200 inch travel.

Figure 9:
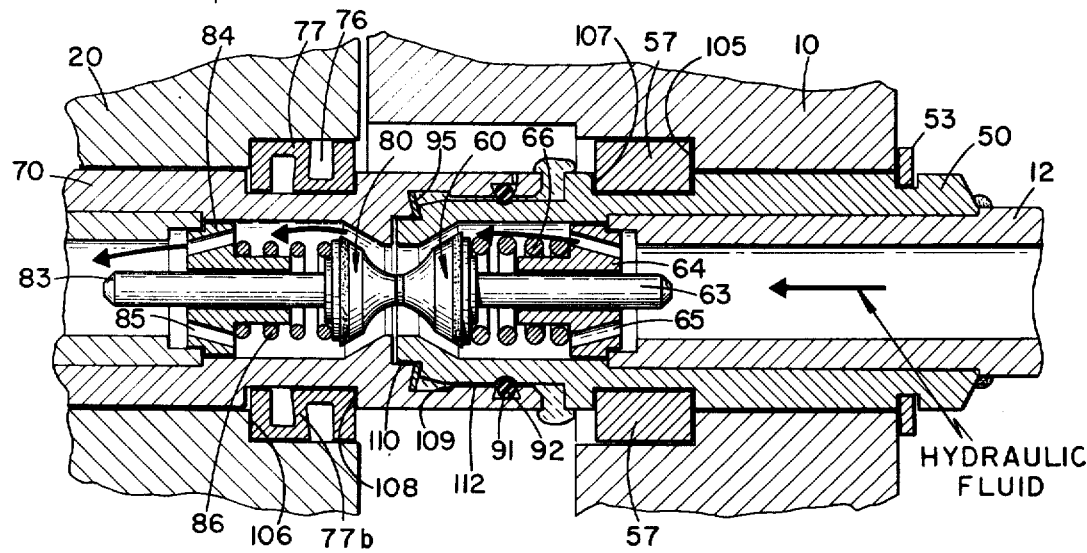
FIG. 9 is a view of the hydraulic coupling of FIG. 6 after make up.
Figure 7:
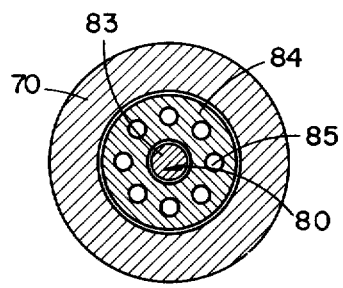
FIG. 7 is a view taken along lines 7—7 of FIG. 6.
Figure 8:
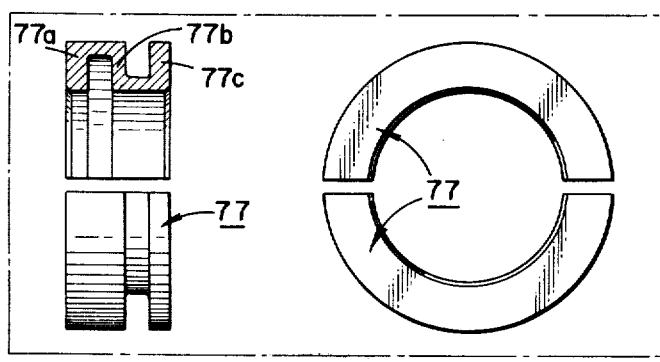
FIG. 8 illustrates the keeper on the female half of the hydraulic coupling of FIG. 6.

As shown more clearly in FIG. 8, ring 77 is "S" shaped in cross-section and is composed of two end portions 77a and 77c of a specified thickness, joined by a center portion 77b of lesser thickness. When specified opposing pressures are applied against the two end portions the center portion will begin to deform as shown in FIG. 9. The ring functions as a compression spring and allows full coupler make up.

In operation, when it is desired to connect or couple the multiple hydraulic control connector flowlines 12 and 23 together and carrier conduit 21 (with attached flange 20) to carrier conduit 12 (with attached flange 10) an axially operable actuator (not shown) directs force against ring member 37 and shouldered surface 13 in the directions indicated by the arrows one and two, respectively, (see FIGS. 4 and 5). Locking fingers 35 are driven toward flange 10. The inside conical surfaces 41 of locking fingers 35 act as a guide to direct flange 10 into a position of axial concurrence as flanges 10 and 20 are drawn together by the axially energized actuator to culminate in a mated position with respect to one another as illustrated in FIG. 4. Guide recesses 15 and guide pins 25 provide final axial alignment and rotational alignment by the engagement of pins 25 in recesses 15. Pins 25 also serve as bosses to protect the poppet valves in the event of axial misalignment. Cylindrical sleeve 29 moves toward flange 20 along with collar 36 of locking fingers 35 until surface 30 engages stop surface 28 formed on the forward end of conduit 21. Applying axial force to the inner surface of collar 46 of cylindrical housing 45 in the direction of arrow three (see FIG. 5) slidably engages the external taper 40 of locking fingers 35 on the inner taper 48 of housing 45 inherently collapsing expandable locking fingers 35 so as to engage surfaces 43 and 44 of recesses 42 with surface 14 of flange 10 and surface 24 of flange 20, respectively, as seen in FIG. 5.

As the carrier conduits 11 and 21 are brought and locked together the female and male parts of the hydraulic connectors for the flowlines also engage and mate as illustrated in FIGS. 6 to 9. The female half of each coupler (sleeve 70) is always the retrievable, replaceable half of the coupling. That half carries the expendable 0-ring 92 and metal gasket 95. Water is excluded from the closed hydraulic system to which flowlines 12 are connected during the mating of the connections by prefilling the space 100 of each female part of the coupling with grease. Grease is expelled from space 100 during the initial entry of sleeve 50 into space 100 until the outer surface 112 of sleeve 50 sealingly engages O-ring 92. At this point the remaining grease trapped in space 100 is forced through poppet valve 80 into hydraulic flowline 23. In accomplishing such displacement of the grease spring 66 has been made larger than spring 86 to force poppet valve 80 to open instead of poppet valve 60. However, alternatively, the stronger spring could be spring 86 in which event the remaining grease trapped in space 100 would enter hydraulic flowline 12 through poppet valve 60. The grease selected is compatible with and soluble in the hydraulic control fluid. Engagement of the outer surface of sleeve 50 with O-ring 92 seals off flowlines 12 and 23 from extraneous fluids (water). This seal occurs before surfaces 90 and 68 of the poppet valves make contact to cause both valves to open (see FIG. 9). The metal seal gasket 95 engages shoulder 69 of sleeve 50 during the last one-tenth (0.100) of an inch of travel of the connector halves. Groove 58 in sleeve 50 is designed to relieve pressure trapped between O-ring 92 and metal gasket 95 during the final makeup of the connection. The gasket provides an adequate seal with a tolerance of up to two-hundreths (0.020) of an inch of full engagement.

When it is desired to disconnect the multiple hydraulic control connector flowlines 12 and 23 and to disconnect carrier conduit 21 from carrier conduit 11, the axially operable actuator directs axial force to the inner surface of collar 47 of cylindrical housing 45 in the direction of arrow 4 (see FIG. 5) slidably disengaging the external taper of locking fingers 35 from the inner taper 48 of housing 45 to permit locking fingers 35 to expand and unlatch the connection between conduits 11 and 21. As carrier conduits 11 and 21 are separated the female and male parts of the hydraulic couplings for the flowlines also disengage and separate. As these halves separate the metal gasket 95 moves off of surface 93 and maintains its seal against the inner surface of female coupler until the gasket contacts shoulder 109, after approximately 0.250 inch travel during which both poppet valves 60 and 80 have seated. The male surface 110 of connector 50 is then withdrawn from the seal ring. This configuration retains the metal gasket in the female (recoverable) half of the coupler.

Each coupler is capable of adjusting to axial or angular misalignment since they are free to "float" in the plane perpendicular to the axis of the carrier conduits 11 and 21. The ability of the coupler to "float" is provided by a keeper system of positioning the couplers. Each coupler half penetrates either of the carrier flanges 10 or 20 and bears on the machined split-ring keepers 57 or 77. The keepers bear on the recessed shoulders 105 and 106 and the corresponding coupler surfaces 107 and 108. The wall of the recesses 55, 56 and 75, 76 retain the halves of keepers 57 and 77, respectively, in proper position. Snap-ring 53 is installed on sleeve 50 and snap-ring 73 is installed on sleeve 70 from the back side of each carrier flange 10 and 20, respectively, to restrain axial movement of each coupler half. Radial "float" of each coupler half is controlled by the diameter difference between the coupler half and the penetrater hole in each flange and the coupler keeper and the keeper recess. Normally a radial float of five thousandths (0.005) of an inch should be adequate to allow for machining tolerences for multiport connectors. Such a radial "float," along with the axial tolerance to makeup provided by the tapered or slanted metal gasket, enables the use of the connection as a metal sealed multiport interchangeable subsea connection.

Changes and modifications may be made in the specific, illustrative embodiments of the invention shown and/or described herein without departing from the scope of the invention as defined in the appended claims. Thus, types of metal seal gaskets other than the one shown and described herein and valves other than the poppet type valves may be used with this invention.

Having fully described the apparatus, operation, objects and advantages of our invention we claim:

1. A connector for use in connecting a multiplicity of hydraulic subsea flowlines comprising:
 a first carrier conduit;
 a plurality of first flowlines arranged in said first conduit;
 a first flange connected to the end of said first conduit and having a plurality of spaced apart holes therethrough;
 one half of a coupling arranged in each of said holes in the first flange, said one half comprising:
  a first sleeve member having one end extending to about the face of said first flange and having the other end connected to one of said first flowlines and having a first valve means arranged therein;
  said first valve means being normally biased closed to prevent flow of fluids through said first valve means and said first flowline;
  an annular groove formed on the outer surface of said first sleeve member;
  said one end of said first sleeve member forming a tapered shouldered seating surface;
 a second carrier conduit;
 a plurality of second flowlines arranged in said second conduit;
 a second flange connected to the end of said second conduit and having a plurality of spaced apart holes therethrough;
 the other half of said coupling being arranged in each of said holes in said second flange, said other half of said coupling comprising:
  a second sleeve member having one end extending beyond the face of said second flange and having the other end thereof connected to one of said second flowlines and having a second valve means therein;
  said second valve means being normally biased closed to prevent flow of fluids through said second valve means and said second flowline connected thereto;
 each coupling having:
  an "O"-ring seal arranged on the inner wall of said second sleeve member;
  a seal ring arranged in said second sleeve member;
  said one end of said first sleeve member being insertable into said one end of said second sleeve member and said second sleeve member initially containing grease between the end thereof and said second valve means;
  said outer wall of said end of said first sleeve member engaging said "O"-ring in said second sleeve member during initial entry of said first sleeve member into said second sleeve member to trap grease in said second sleeve member and force said grease upon continued movement of said first sleeve member into said second sleeve member through one or both of said valve means into one or both of said flowlines;

said tapered seating shoulder on said first sleeve member engaging said seal ring on said second sleeve member to seal off the interiors of said flowlines from exterior thereof when said coupling is fully made up;

said first and second valve means opening when said coupling is fully sealed to permit flow of fluids through said first and second flowlines.

2. A connector as recited in claim 1 including a shoulder formed on the inner wall of said second sleeve member between said "O"-ring and said seal ring for preventing movement of said seal ring therepast when disconnecting said coupling and removing said first sleeve member from said second sleeve member.

3. A connector as recited in claim 2 including first and second recesses formed on the outer walls of said first and second sleeve members, respectively;

first and second recesses formed on the inner walls of said first and second flanges, respectively;

a first keeper ring arranged in said first recesses; and a second keeper ring arranged in said second recesses, said second keeper ring being deformable.

4. A connector as recited in claim 3 including guide means arranged on said first and second flanges to provide axial and rotational alignment for said connector and coupling.

5. A connector as recited in claim 4 including means for bringing said conduits and coupler halves toward each other and locking said conduits together.

6. A connector for use in connecting a multiplicity of hydraulic subsea flowlines comprising:

a first carrier conduit containing a plurality of first flowlines;

a second carrier conduit containing a plurality of second flowlines;

a coupling connecting each of said first flowlines to each of said second flowlines, each coupling comprising:

a first sleeve member connected to the end of said first flowline;

a second sleeve member connected to the end of said second flowline;

said first sleeve member being insertable within said second sleeve member;

first and second valve means arranged within first and second sleeve members, respectively, closing off flow through said valve means and said first and second flowlines when in one position and permitting flow through said valve means and said first and second flowlines when in another position;

sealing means spaced from the end of and arranged on the inner wall of said second sleeve member for engaging the outer wall of said first sleeve member when said first sleeve member has been inserted into said second sleeve member;

a radially extending sealing shoulder formed by increasing the outside diameter of said first sleeve member from the outside diameter of the end of said first sleeve member;

a radially extending retainer shoulder formed by reducing the inside diameter of said second sleeve member from that of the end of said second sleeve member, said retainer shoulder being spaced a greater distance from the end of said second sleeve member than said sealing means;

a sealing ring arranged in said second sleeve member adjacent said retainer shoulder for engaging said sealing shoulder on said first sleeve member to prevent, when said sealing ring and said sealing shoulder are engaged, flow of fluids to and from the interiors of said flowlines;

said valve means opening after said sealing means and the outer wall of said first sleeve member engage but before said sealing shoulder and sealing ring engage.

7. A connector as recited in claim 6 including a first flange providing an opening and having said first sleeve members arranged in said opening; and a second flange providing an opening and having said second sleeve members arranged in said opening.

8. A connector as recited in claim 7 including means arranged between each of said first sleeve members and said first flange for maintaining said first sleeve members in said first flange; and means arranged between each of said second sleeve members and said second flange for maintaining said second sleeve members in said second flange.

9. A connector as recited in claim 8 in which said means for retaining said first and second sleeve members in said first and second flanges, respectively, comprise ring members.

10. A connector as recited in claim 9 wherein said ring members arranged between said second sleeve members and said second flange are deformable.

11. A connector as recited in claim 10 including guide means arranged on said first and second flanges to provide axial and rotational alignment for said connector and couplings.

12. A connector for use in connecting a multiplicity of hydraulic subsea flowlines comprising:

a first carrier conduit containing a plurality of first flowlines;

a second carrier conduit containing a plurality of second flowlines;

a coupling connecting each of said first flowlines to each of said second flowlines, each coupling comprising:

a first sleeve member connected to the end of said first flowline;

a second sleeve member connected to the end of said second flowline;

said first sleeve member being insertable within said second sleeve member;

first and second valve means arranged within said first and second sleeve members, respectively, closing off flow through said valve means and said first and second flowlines when in one position and permitting flow through said valve means and said first and second flowlines when in another position;

sealing means arranged on the inner wall of said second sleeve member engaging the outer wall of said first sleeve member when said first sleeve member has been inserted into said second sleeve member;

a sealing shoulder formed on the end of said first sleeve member;

a sealing ring arranged in said second sleeve member for engaging said sealing shoulder on said first sleeve member to prevent, when engaged, flow of fluids to and from the interiors of said flowlines;

said valve means opening after said sealing means and the outer wall of said first sleeve member engage but before said sealing shoulder and sealing ring are engaged;

a first flange;

said first sleeve members being arranged in said first flange;

a second flange;

said second sleeve members being arranged in said second flange;

a ring member arranged between each of said first sleeve members and said first flange for maintaining said first sleeve members in said first flange;

a deformable ring member arranged between each of said second sleeve members and said second flange for maintaining said second sleeve members in said second flange;

guide means arranged on said first and second flanges to provide axial and rotational alignment for said connector and couplings; and grease arranged in said second sleeve members to exclude water therefrom prior to full makeup of said coupling halves.

13. A connector as recited in claim 12 including arranging each coupling half in its respective flange in a manner and being provided with means so as to permit said coupling halves to float in a plane perpendicular to the axis of said conduits to adjust for axial and angular misalignment.

14. A connector as recited in claim 13 in which said means to permit said coupling halves to float includes a difference in the diameter of each coupler half and the diameter of said opening in the flange in which said coupler half is arranged.

15. A connector as recited in claim 14 in which said sealing ring comprises a tapered metallic gasket capable of providing axial tolerance in making a seal with said sealing shoulder on said first sleeve member.

16. A connector as recited in claim 15 including means for bringing said conduits towards each other and locking said conduits together.

17. A connector as recited in claim 16 in which said first coupling halves are fixed undersea and nonretrievable and said second coupling halves are retrievable.

18. A connector as recited in claim 17 in which each valve means comprises a poppet valve, said poppet valves being normally closed and engaging to open and permit flow of fluids through said flowlines.

19. A connector for use in connecting a multiplicity of flowlines comprising:
a first carrier conduit containing a plurality of first flowlines;
a first carrier conduit containing a plurality of second flowlines;
a coupling connecting each of said first flowlines to each of said second flowlines, each coupling comprising:

a first sleeve member connected to the end of said first flowline;

a second sleeve member connected to the end of said second flowline;

said first sleeve member being insertable within said second sleeve member;

sealing means arranged on the inner wall of said second sleeve member engaging the outer wall of said first sleeve member when said first sleeve member has been inserted into said second sleeve member;

a radially extending sealing shoulder formed on said first sleeve member;

a metallic sealing ring arranged in said second sleeve member for engaging said sealing shoulder on said first sleeve member to prevent, when engaged, flow of fluids to and from the interiors of said flowlines; and a radially extending retainer shoulder formed by reducing the inside diameter of said second sleeve member from that of the end of said second sleeve member for retaining said sealing ring in said second sleeve member, said retainer shoulder being spaced a greater distance from the end of said second sleeve member than said sealing means.

20. A connector as recited in claim 19 in which said ring retainer means comprises a tapered shoulder formed on the inner wall of said second sleeve member; and said sealing ring comprises a tapered gasket capable of providing axial tolerance in making a seal with said sealing shoulder on said first sleeve member.

21. A connector as recited in claim 20 including:
first and second valve means arranged within said first and second sleeve members, respectively, closing off flow through said valve means and said first and second flowlines when in one position and permitting flow through said valve means and said first and second flowlines when in another position; each of said valve means being spring-biased to closed position, one of said spring-biasing means being stronger than the other spring-biasing means.

22. A connector as recited in claim 21 including a shoulder formed on the inner wall of said second sleeve member between said sealing means and said seal ring for preventing movement of said seal ring therepast when disconnecting said coupling and removing said first sleeve member from said second sleeve member.

23. A connector as recited in claim 22 including an annular groove formed on said first sleeve member, the spacing of said sealing means and seal ring and groove being such that said sealing shoulder engages said sealing ring prior to positioning of said groove adjacent said sealing means.

24. A connector as recited in claim 3 in which said second keeper ring is S-shaped.

* * * * *